US 8,504,877 B2

(12) United States Patent
Davenport et al.

(10) Patent No.: US 8,504,877 B2
(45) Date of Patent: Aug. 6, 2013

(54) METHOD AND SYSTEM FOR PLATFORM INDEPENDENT FAULT MANAGEMENT

(75) Inventors: Scott W. Davenport, San Diego, CA (US); Tarik Pertev Soydan, Acton, MA (US); Louis Yonlo Tsien, Watertown, MA (US)

(73) Assignee: Oracle America, Inc., Redwood Shores, CA (US)

( * ) Notice: Subject to any disclaimer, the term of this patent is extended or adjusted under 35 U.S.C. 154(b) by 252 days.

(21) Appl. No.: 13/118,723

(22) Filed: May 31, 2011

(65) Prior Publication Data
US 2011/0231707 A1 Sep. 22, 2011

Related U.S. Application Data

(63) Continuation of application No. 12/329,146, filed on Dec. 5, 2008, now Pat. No. 7,992,044.

(51) Int. Cl.
*G06F 11/00* (2006.01)
(52) U.S. Cl.
USPC ............................................................ 714/37

(58) Field of Classification Search
USPC ................. 714/37, 38.1, 39, 40, 46, 47.1, 48, 714/49, 52, 57
See application file for complete search history.

(56) References Cited

U.S. PATENT DOCUMENTS

| | | | |
|---|---|---|---|
| 6,694,455 B1 * | 2/2004 | Scrandis et al. | 714/31 |
| 6,854,069 B2 * | 2/2005 | Kampe et al. | 714/4.12 |
| 7,231,550 B1 * | 6/2007 | McGuire et al. | 714/26 |
| 7,343,524 B2 * | 3/2008 | Klotz et al. | 714/39 |
| 7,441,154 B2 * | 10/2008 | Klotz et al. | 714/39 |
| 7,487,433 B2 * | 2/2009 | Sivakumar et al. | 714/799 |
| 7,992,044 B2 * | 8/2011 | Davenport et al. | 714/37 |
| 2005/0102567 A1 * | 5/2005 | McGuire et al. | 714/25 |
| 2009/0094484 A1 * | 4/2009 | Son et al. | 714/26 |

* cited by examiner

*Primary Examiner* — Nadeem Iqbal
(74) *Attorney, Agent, or Firm* — Osha Liang LLP

(57) ABSTRACT

A method for fault management. The method includes generating, in firmware of a computer system, a physical resource inventory (PRI) of a plurality of hardware components of the computer system, wherein the PRI defines a hierarchy of the hardware components. The method further includes traversing, by an enumerator executing in a fault manager, the PRI to generate a topology of the plurality of hardware components. The topology is used for fault management of the computer system.

14 Claims, 7 Drawing Sheets

METHOD AND SYSTEM FOR PLATFORM INDEPENDENT FAULT MANAGEMENT

CROSS-REFERRENCE TO RELATED APPLICATIONS

This application is a continuation application of U.S. patent application Ser. No. 12/329,146, entitled "METHOD AND SYSTEM FOR PLATFORM INDEPENDENT FAULT MANAGEMENT", and filed on Dec. 5, 2008. Accordingly, this continuation application claims benefit of U.S. application Ser. No. 12/329,146 under 35 U.S.C. §120. U.S. patent application Ser. No. 12/329,146 is incorporated herein by reference.

BACKGROUND

Computer systems include software and hardware. The hardware includes processors, memory, input and output components, and other physical devices. Occasionally, different components of hardware may malfunction. The malfunctioning of a hardware component is an error. Specifically, an error is an unexpected condition, result, signal, or datum in a computer system or network.

Some computer systems provide fault management. Fault management provides a mechanism for detecting errors, determining the cause of the error, and correcting the cause. Specifically, when an error is detected the cause of the error may be determined to prevent future errors of the same type and to ensure that the error is not a symptom of a more serious problem of the computer system. The cause of the error is a fault. In particular, a fault is a problem that is in the hardware that may produce the error.

Fault management may be performed in the operating system of the computer system. In order to provide fault management, the operating system typically requires information about the hardware structure of the computer system. Thus, prior to shipping a new type of computer system, the operating system that is to execute on the hardware of the computer system is programmed with information about the hardware. Then, computer system is shipped with the hardware and operating system.

SUMMARY

In general, in one aspect, the invention relates to a method for fault management. The method includes generating, in firmware of a computer system, a physical resource inventory (PRI) of a plurality of hardware components of the computer system, wherein the PRI defines a hierarchy of the hardware components. The method further includes traversing, by an enumerator executing in a fault manager, the PRI to generate a topology of the plurality of hardware components. The topology is used for fault management of the computer system.

In general, in one aspect, the invention relates to a computer system. The computer system includes a plurality of hardware components. The computer system also includes firmware configured to generate a physical resource inventory (PRI) of the plurality of hardware components in the computer system. The PRI defines a hierarchy of the hardware components. The computer system also includes an enumerator executing on a operating system and configured to traverse the PRI to generate a topology of the plurality of hardware components. The topology is used for fault management of the computer system.

In general, in one aspect, the invention relates to a computer readable medium that includes instructions executable by a process to traverse a physical resource inventory (PRI) to generate a topology of a plurality of hardware components in the computer system. The firmware of the computer system generates the PRI. The computer readable medium further includes instructions to receive an error report from firmware, identify an error class from the error report, and identify a fault management resource identifier from the error report. The fault management resource identifier explicitly identifies a location of a detector that detected the error. The computer readable medium further includes instructions to process the error report using the error class, the fault management resource identifier, and the topology to identify a fault of the computer system.

Other aspects of the invention will be apparent from the following description and the appended claims.

DETAILED DESCRIPTION

Figure 1:
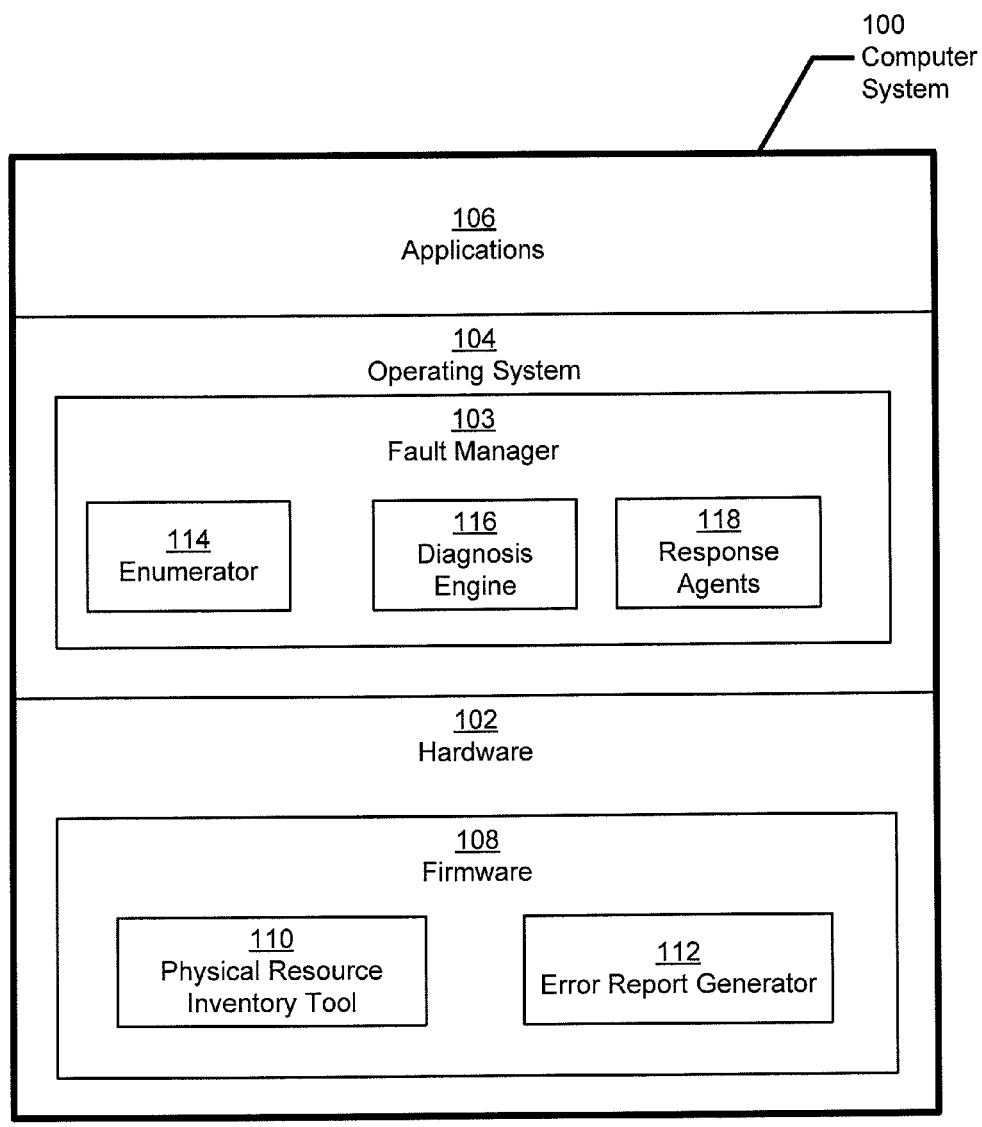
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency. Further, the use of "FIG." in the drawings is equivalent to the use of "Figure" in the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for performing platform independent fault management. Specifically, embodiments of the invention are directed to fault management in software when the software is not pre-programmed with information about the topology of the hardware. More specifically, in one or more embodiments of the invention, the software is not pre-programmed with specific knowledge of processor architecture or the specific resilience for correctable errors (discussed below). In one or more embodiments of the invention, firmware in the computer system includes functionality to provide a physical resource inventory (PRI) to the software. The PRI defines, in a hierarchical manner, information about the hardware components in the computer system, such as the type of hardware components and the layout of the hardware components. The software iterates through the PRI to create a topology of the hardware components. The topology may be used for fault management of the computer system. Specifically, the topology may be used to identify the faulty component and to correct the faulty component.

Thus, embodiments of the invention provide a mechanism for the same software to correctly diagnose an error regardless of the computer architecture. For example, a particular error may affect an individual core on one processor, but the entire chip on another. The software may not make presumptions about whether the individual core or entire chip is affected. Thus, the software allows for accurate diagnosis given either architecture. Specifically, information in error reports provided from the firmware to the software "guides" the software in making the diagnosis.

FIG. 1 shows a schematic diagram of a system in accordance with one or more embodiments of the invention. As shown in FIG. 1, the system includes a computer system (100). The computer system (100) includes hardware (102), an operating system (104), and one or more user-level applications (106).

In one or more embodiments of the invention, the hardware (102) includes various hardware components (not shown) and firmware (108). The hardware components are physical devices for executing software and storing data. For example, the hardware components may include chips, strands, processor cores, memory, secondary storage, system board (i.e., a motherboard), input/output devices, system controller, sensors, and/or other physical devices/components.

In one or more embodiments of the invention, the firmware (108) provides low-level functionality for the hardware. For example, the firmware (108) may monitor sensors in the hardware to detect the presence of errors, detect the presence of hardware, create a low-level inventory of the hardware, power-up and power-down hardware components, and perform other functions directly on the hardware. The firmware (108) may be located permanently in the programmable read only memory (PROM), ROM or semi-permanently in erasable programmable ROM of one of the hardware components. The firmware (108) is stored, executed from non-volatile memory, and remains in the non-volatile memory after the computer system is powered down. The firmware (108), for example, may be located on and executed by a system controller.

In one or more embodiments of the invention, the firmware (108) includes a PRI tool (110) and an error report generator (112). The PRI tool (110) includes functionality to create a PRI (not shown) of the hardware components on the computer system (100). In one or more embodiments of the invention, the PRI tool (110) may include functionality to detect the presence of a new hardware component and add the hardware component to the PRI. In general, the PRI provides an inventory of the hardware components of the computer system (100). Specifically, the PRI is created by firmware (108) and used by software, such as the fault manager (103). The PRI is discussed in more detail below after the discussion of FIG. 1.

Continuing with the firmware (108) in FIG. 1, the error report generator (112) includes functionality to detect an error in the hardware (102) and generate an error report (not shown) based on the detection of the error. In one or more embodiments of the invention, the error report is presented in a manner that is generic to all computer systems. Specifically, the error report is presented such that the diagnosis engine (114) (discussed below) does not require additional information about the hardware to diagnose the error. Error reports are discussed in more detail below after the discussion of FIG. 1.

Continuing with FIG. 1, the firmware (108) includes functionality to provide information to the operating system (104). The operating system (104) includes functionality to provide an execution environment for applications. Specifically, the operating system is the software component of a computer system that is responsible for management and coordination for using the limited resources in the computer system (100). For example, an operating system may schedule applications (106) to execute on the processor(s) (not shown) in the hardware (102) of the computer system (100). As another example, the operating system (104) may provide an application programming interface (API) for all applications (106) executing on the computer system (100). The API may be used by the applications (106) to request the operating system (104) allocate memory to applications, protect memory access from malicious applications, and perform protected operations on behalf of applications. In one or more embodiments of the invention, the operating system (104) is a program that is loaded in RAM when the computer system (100) boots. The operating system (104) provides the core functionality to allow applications executing on the computer system to interface with the underlying firmware and hardware.

In one or more embodiments of the invention, the operating system (104) includes a fault manager (103). A fault manager (103) includes functionality to perform fault management of the computer system. In one or more embodiments of the invention, the fault manager (103) does not execute in privileged mode of the operating system. In alternative embodiments of the invention, the fault manager (103) may execute in privileged mode. Further, although FIG. 1 shows the fault manager (103) as part of the operating system (104), in alternative embodiments of the invention, the fault manager (103) may execute as part of the applications (106). In one or more embodiments of the invention, the fault manager (103) includes an enumerator (114), a diagnosis engine (116), and response agents (118). Each of the components of the operating system (104) is discussed below.

In one or more embodiments of the invention, an enumerator (114) includes functionality to obtain the PRI from the firmware (108) and construct a topology (not shown) of the computer system (100). In one or more embodiments of the invention, the topology is a hierarchical structure that defines containment between different components of the computer system. In one or more embodiments of the invention, the topology is reformatted information from the PRI. Specifically, each topology node in the topology may have a corresponding node in the PRI. In one or more embodiments of the invention, the topology is constructed in a two phases. In the first phase, topology nodes are constructed from PRI nodes in the PRI in order of containment. When a pci-express fabric node is identified during the first phase, the pci-express fabric node is ignored in the first phase. In the second phase, the pci-express fabric is enumerated.

Continuing with FIG. 1, a diagnosis engine (116) includes functionality to obtain error reports from the firmware (108), record the errors, and identify fault(s) of the computer system (100) based on the error reports. In one or more embodiments of the invention, the diagnosis engine (116) may include functionality to identify the location of the faulty component using the topology. Further, for correctable errors, the diagnosis engine includes functionality to change the number of allowed errors and the duration of time for the number of errors based on error reports from the firmware in accordance with one or more embodiments of the invention.

In one or more embodiments of the invention, the response agents (118) include functionality to correct the fault. For example, the response agents (118) may include functionality to change the execution of the computer system, halt actions being performed by the computer system (100), notify an administrator of the computer system (100) to replace a hardware component of the computer system, and perform other such responses.

Although not shown in FIG. 1, the operating system may further include an operating system device store. In one or more embodiments of the invention, the operating system device store maintains information about PCI express fabric devices. Specifically, the operating system device store maintains a repository of information about devices external to the computer system. The information may be gathered, for example, by detecting the devices when the devices are attached to the PCI express fabric. Further, the repository of information in the operating system device store may further include information about PCI express fabric devices that are internal to the computer system. The information about internal PCI express fabric devices may be gathered from a portion of the PRI. In such a scenario, the PRI provides the information to the operating system prior to loading the fault manager in accordance with one or more embodiments of the invention. Although other data structures are possible, in one or more embodiments of the invention, the operating system device store is a tree.

The following is a discussion of the PRI. The PRI identifies the properties of hardware components. The PRI may also identify relationships between the different hardware components. In one or more embodiments of the invention, the PRI node may include a reference to each parent PRI node of the current PRI node and a reference to each child PRI node of current PRI node. In one or more embodiments of the invention, the parent-child relationship is defined as containment or direct connectivity between the hardware components. In one or more embodiments of the invention, each hardware component is represented in the PRI as a PRI node. For example, consider the scenario in which a chip X contains processor Y, and processor Y contains strand Z. In such a scenario, the PRI node for chip X may include a child reference to the PRI node for processor Y, and the PRI node for processor Y may include a child reference to the PRI node for strand Z. Alternatively or additionally, the PRI node for strand Z may include a parent reference to the PRI node for processor Y, and the PRI node for processor Y may include a parent reference to the PRI node for chip X.

Moreover, a PRI node identifies the hardware component and provides information about the hardware component via properties of the PRI node. Some of the properties are required properties while other properties are optional. Below is a table that enumerates some of the properties in a PRI node. The content of the table is merely provided as an example and is not intended to limit the scope of the invention. Table 1: Properties of PRI Nodes

| Category of Property | Property Name | Purpose of Property |
| --- | --- | --- |
| General | Type | The type property specifies type of hardware component. For example, the type property may have values of "sys_board" (System board); "dimm" (Dual in-line memory module (DIMM)); "processor"; "Strand"; "mem-board" (physical memory board); "pciexrc" (PCI express fabric device that is a root complex (i.e., the start of a particular PCI express fabric)); "I/O-device"; "CPU-board" (central processing unit (CPU) board). |
| General | Name | The name property provides a string description of the hardware component. For example, the name property may have values of "CPU Chip 0"; "CPU Chip 0 Core 0" |
| General | Identifier | The identifier property provides a unique identifier amongst all hardware components of the same type. |
| General | topo-skip | The topo-skip property indicates whether the hardware component should be skipped when constructing the topology. For example, the topo_skip property may have values of "0" or "1" |
| General | FRU | The FRU property specifies whether the component is a field replaceable unit (FRU). A FRU is a hardware component that may be replace independently of the component on which the FRU resides. In one or more embodiments of the invention, a FRU may be replaced while the computer system is deployed. The FRU may have values of "0" or "1". |
| General | cfg_handle | The cfg_handle property uniquely identifies a device. In one or more embodiments of the invention, the cfg_handle device is required for the root complex of a PCI express fabric. |
| FRU | serial_number | The serial_number property identifies the serial number of the FRU for replacement purposes. |
| FRU | part_number | The part_number property identifies the part number of the FRU for replacement purposes. |
| FRU | revision_number | The revision_number property identifies the revision number of the FRU for replacement purposes. |
| FRU | dash_number | The dash_number property identifies the dash number of the FRU for replacement purposes. |
| FRU | location string | The location string property identifies the location string number of the FRU for replacement purposes. |
| I/O device | chassis location name | The chassis location name identifies the location string name string for the hardware component. |
| I/O device | path | The path property identifies the physical location of the I/O device with respect to the other hardware components in the chassis. |
| I/O device | I/O device type | The I/O device type identifies the type of I/O device. |
| I/O device | slot name | The slot name property identifies the slot in the chassis in which the device is located. |

-continued

| Category of Property | Property Name | Purpose of Property |
|---|---|---|
| Read only memory (ROM) | contents | The contents property includes information about the contents of the ROM. |
| ROM | base_property | The base property identifies the base physical address of the ROM. |
| ROM | size_property | The size_property identifies the size of the ROM |
| Random access memory (RAM) | contents | The contents property includes information about the contents of the RAM. |
| RAM | base_property | The base property identifies the base physical address of the RAM. |
| RAM | size_property | The size_property identifies the size of the RAM |

The above table provides examples of properties that may be defined for a PRI node of the PRI. The PRI node may include other properties without departing from the invention.

Returning to error reports, the following discussion describes error reports in accordance with one or more embodiments of the invention. The error reports provide a mechanism to present data in a manner that is generic to different designs of hardware components. Thus, the same format of error report may be used to represent the same type of hardware errors that are produced by different manufacturers, versions, and design variations of a hardware component. In one or more embodiments of the invention, the error report includes multiple fields. Each field consists of a name-value pair which describes an aspect of the error. In one or more embodiments of the invention, the fields in the error report are dependent on the error class of the error.

For example, the error class for processor internal memory errors lists error related information for processors. The error related information is generic to different manufacturers, versions, and design variations of processors. In other words, even though each manufacturer may have different configurations of cores, strands, and on chip memory, the processor internal memory error report (i.e., an error report in the error class of processor internal memory) lists information with the same fields regardless of the manufacturer of the processor. Thus, while the error class may be specific to the type of error, the error class is generic to the type of processor in accordance with one or more embodiments of the invention.

In general, each error class is specific to the type of error detected. For example, the type of errors for which a corresponding error class exists may include translation lookaside buffer (TLB) errors, low-level cache errors, register errors, processor internal memory errors, unified cache errors, coherency ordering unit (COU) errors, dynamic RAM (DRAM) errors, memory link errors for system using buffer on board, memory link errors for systems using fully buffered dual inline memory modules (FB-DIMMS), bus parity and timeout errors, address out-of-bounds errors, etc. In one or more embodiments of the invention, an additional error class for cpu/core/chip errors for future expansion may be used for a processor that introduces a new resource that is not to be grouped into other resources at the same level as the processor. Specifically, the error class for cpu/core/chip errors for future expansion may be inherently generic and provide abstract detail about the error in the class name. The name value pairs in the error reports belonging to the error class may provide the additional detail. Although the above presents a general list of types of errors in which an error class may exist, other error classes may exist without departing from the invention.

In one or more embodiments of the invention, the errors discussed above may have multiple corresponding error classes. For example, an error class may exist for data TLB error and a separate error class may exist for instruction TLB errors. Similarly, two different error classes may exist depending on whether the error is a correctable error or a non-correctable error. For example, one error class may exist for a data TLB error that is correctable while another error class exists for a data TLB error that is not correctable. A correctable error is an error in which the hardware or software includes functionality to correct. The first few errors of a particular type of correctable error may be considered as non-indicative of a fault of the computer system. For example, the first few errors may be standard errors that are expected to occur when the computer system executes. With correctable errors, however, more errors than expected in a specified duration of time may be a symptom of a fault in the computer system.

In one or more embodiments of the invention, each error report is composed of multiple fields. Below is a discussion of fields for different types of example error classes. Although the following discussion describes some of the fields, different fields for each error class may be used in alternative embodiments of the invention.

In one or more embodiments of the invention, the error classes for correctable errors include soft error rate discriminator (SERD) fields. SERD fields provide a mechanism for reporting correctable errors as a fault only after a threshold number of errors occurred within a specified duration of time. In one or more embodiments of the invention, the threshold number and the specified duration of time is set by the operating system. However, in accordance with one or more embodiments of the invention, the firmware may modify the duration of time and the number of errors through the SERD fields. In such a situation, although the operating system recognizes a default duration of time and number of errors values, designers of a specific computer system or family of similar computer systems may override the default values within the firmware according to the specific characteristics of the computer system or family of similar computer systems using the values in the SERD fields. Thus, the SERD fields provide a generic mechanism for the firmware to provide values specific to the type of computer system. In one or more embodiments of the invention, the SERD fields include a time duration value that overrides the default duration of time value and a number value that overrides the default number of errors detected. Further, the SERD fields may include a filter_ratio value for SERD errors to indicate that the error report represents filter_ratio errors.

In specific embodiments of the invention, each error class includes a trap state (tstate), hypervisor trap state (htstate), and trap program counter (tpc). The error class may also include a value identifying the trap level (t1), a value identifying the trap type (tt). Each error class may also include a valid field in accordance with one or more embodiments of the invention. The valid field indicates to the diagnostic engine whether the diagnostic engine should process the error report. For example, a valid field that includes a value indicating that the error should not be processed may be because the error is identified as a side effect or a duplicate of another error. Thus, the valid field provides an additional mechanism for the firmware to control the diagnosis of the error in software. The error report may also include platform specific information. In one or more embodiments of the invention, the platform specific information is not used by the diagnosis engine (116) (discussed below). Rather, the platform specific information may be used for further analysis, such as by a developer. Nonetheless, the fault manager (103) may present the platform specific information from the error report.

Further, each error class may include a detector value that describes the detector that detected the error. Specifically, the detector value may provide information about the hardware component with the detector. The hardware component information is denoted by a fault management resource identifier. Specifically, the fault management resource identifier may be a list having all hardware components that contain the hardware component. For example, if the hardware component is a strand, the fault management resource identifier may provide a list that includes the motherboard, the chip, the core, and the strand. Each hardware component listed in the list may be listed as a grouping of name-value pairs. For example, one name-value pair in the grouping may identify the type of hardware component, while another name-value-pair identifies the unique identifier for the hardware component.

For example, a chip may be represented in the name-value list with a name-value pair that identifies the type of chip and another name-value pair that identifies a unique identifier for the chip. The ordering of the groups of name-value pairs in the name-value list describes a path to the detector that detected the error. For example, if the error is detected by a detector on a strand, then the ordering may be the motherboard having the chip, the chip having the core, the core having the strand, and then the strand itself. Similarly, if a detector on a core detects an error, then the name-value list may be ordered as the motherboard having the core, the chip having the core, and the core.

In certain situations, the name-value list may not include the path to the detector that detected the error. For example, if the component that failed is a TLB that is shared by multiple strands and one of the strands detected the error of the TLB, then the error report may only list the core even though the strand detected the error. Namely, because the error existed on a TLB that is shared by multiple strands, the error report identifies the hardware component, namely the core, that includes the TLB.

Returning to the error reports as a whole, in addition to the fields discussed above, error reports may include fields specific to the type of error class. For example, the error report for a TLB error class may have a field for the index to the TLB entry that has the error. A cache error class may have a field for the index to the cache entry that has the error and provide information about the associativity of the cache. The error report for COU errors may also include a fault management resource identifier identifying the sender of the error for error that span more than one chip. Namely, in addition to providing information about the detector of the error, the error report may also include information about the sender of the data having the error, which the detector detected.

In another example, the error report for the DRAM error class may identify the physical address where the error occurred, the offset where the error occurred, the position of the symbol where the error occurred, and a relative check word. The error report may include a DRAM number that identifies the number of DRAM chips on the DIMM having the correctable symbol in error, and a fault management resource identifier that identifies the DIMM or array of Dims on which the DRAM is located.

In another example, error reports for memory link error classes may include a fault management resource identifier that identifies the resource, such as the chip, memory controller, or memory buffer with the error. The error report for an address out of bounds error may include the value of the physical address that caused the error.

Figure 2:
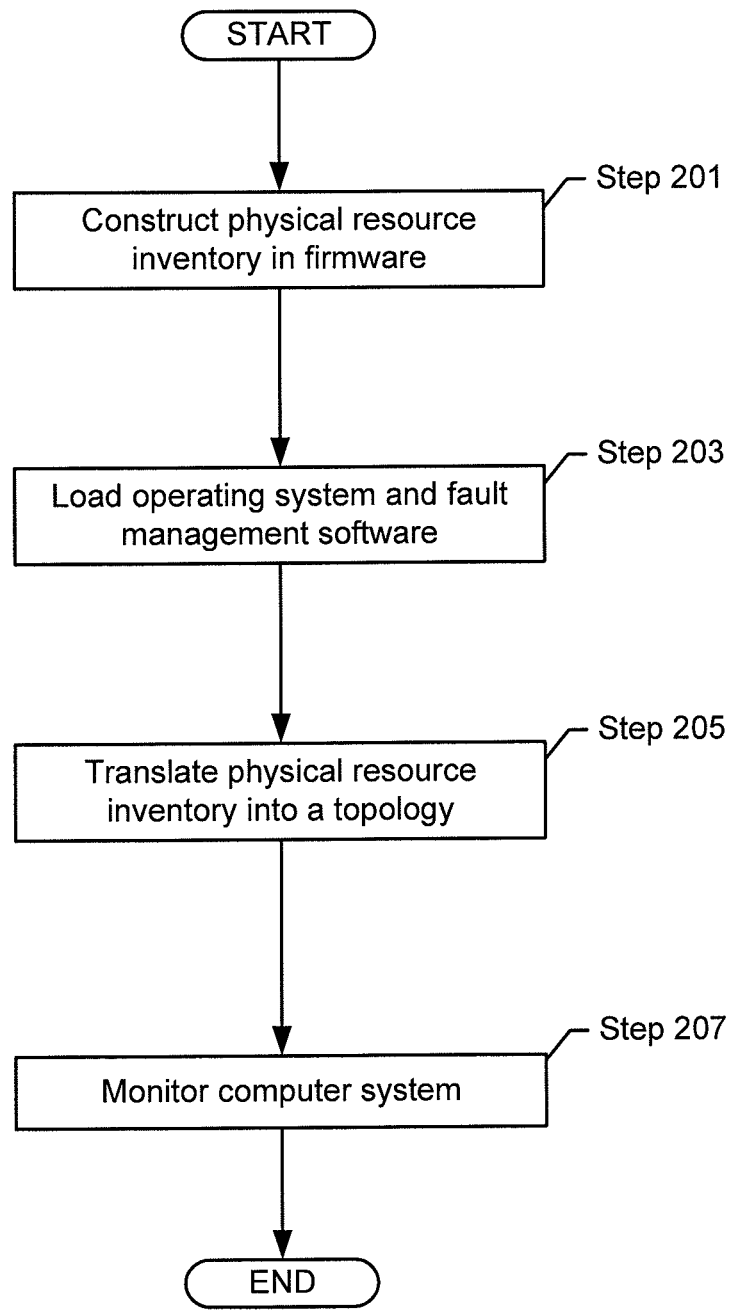
FIGS. 2-4 show flowcharts in accordance with one or more embodiments of the invention.
Figure 3A:
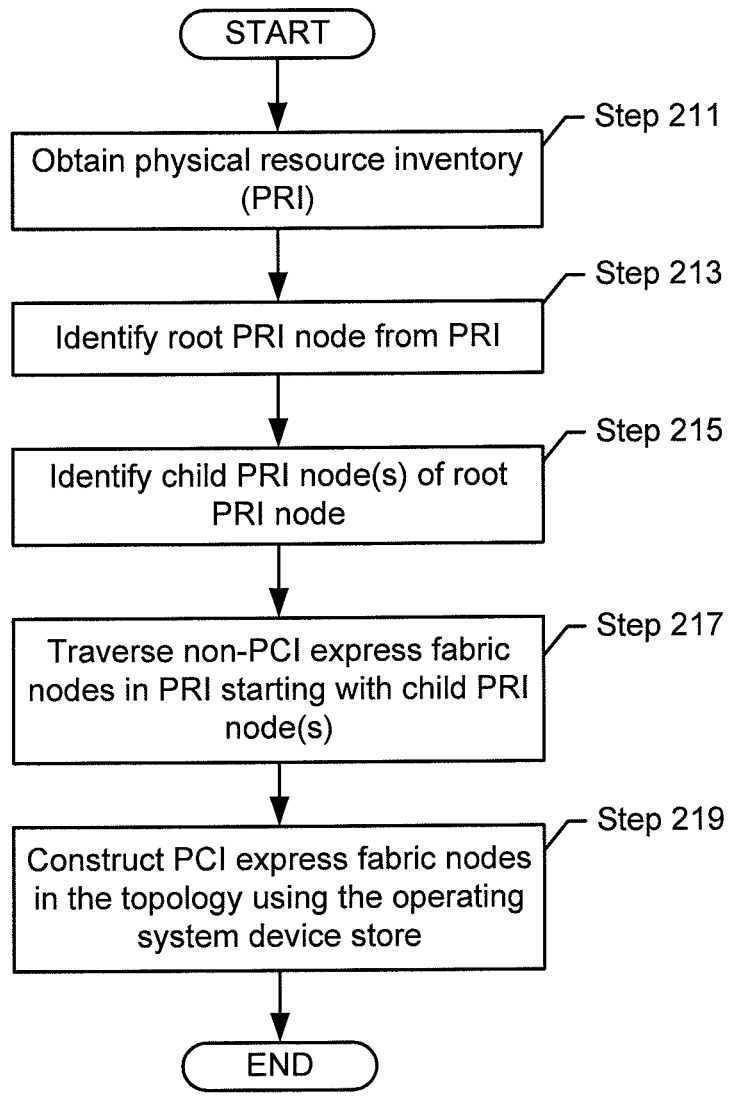
Figure 3B:
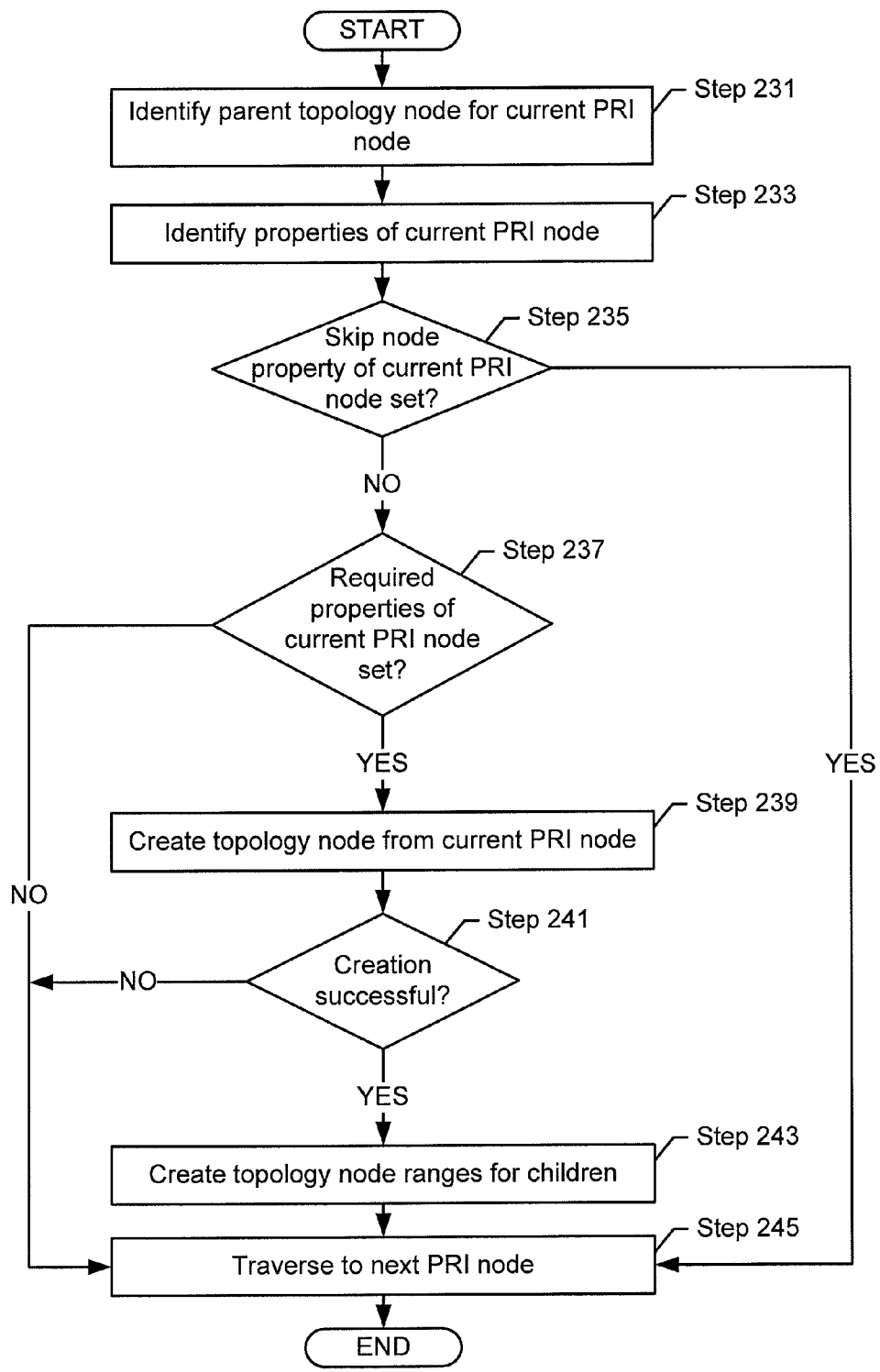
Figure 3C:
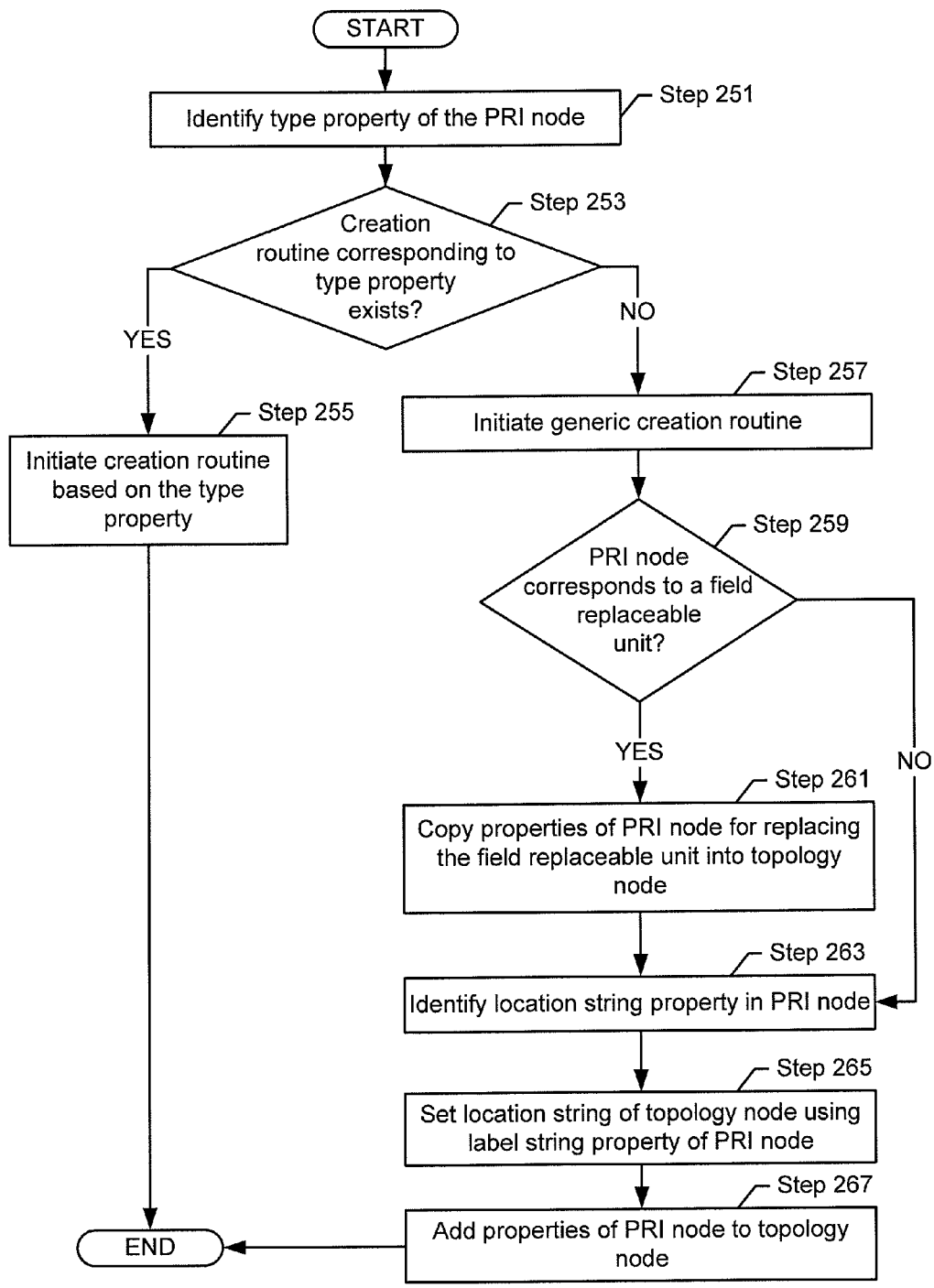
Figure 4:
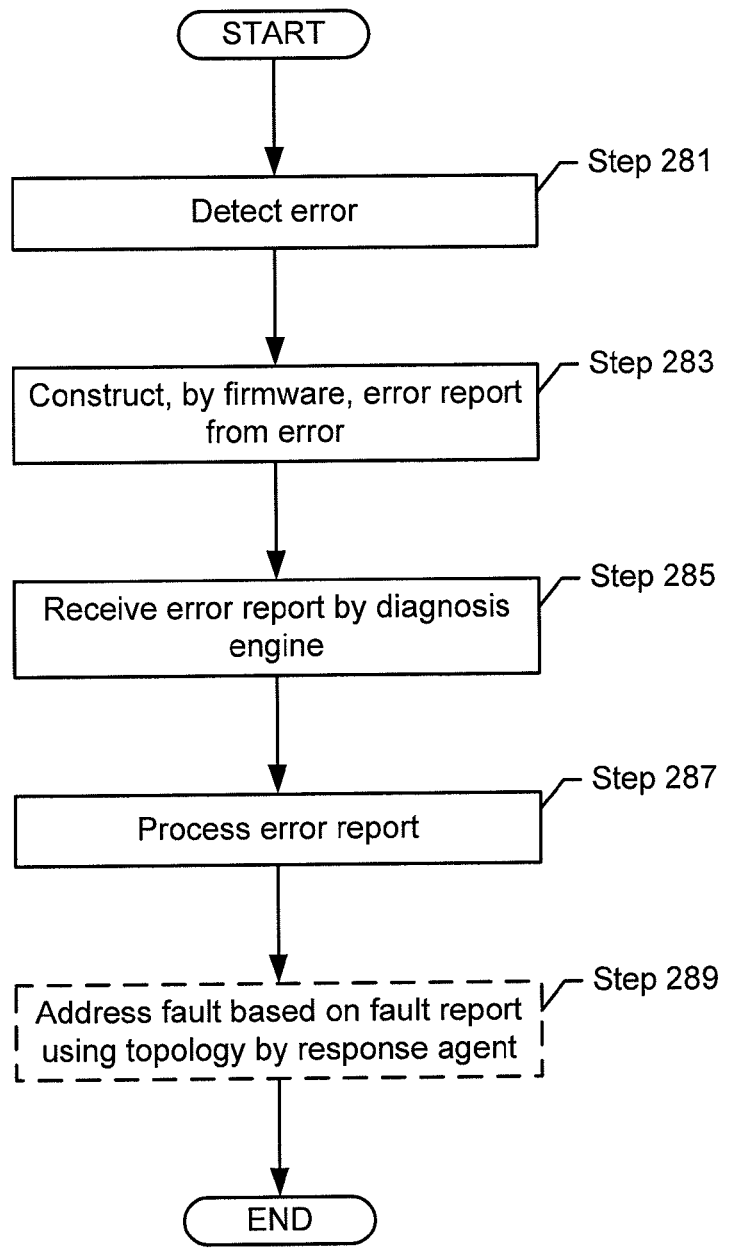

FIGS. 2-4 shows flowcharts in accordance with one or more embodiments of the invention. While the various steps in these flowcharts are presented and described sequentially, one of ordinary skill will appreciate that some or all of the steps may be executed in different orders, may be combined, or omitted, and some or all of the steps may be executed in parallel.

FIG. 2 shows a flowchart providing a generic overview of fault management in accordance with one or more embodiments of the invention. In step 201, a PRI is constructed in firmware. In one or more embodiments of the invention, firmware constructs the PRI by detecting the existence of hardware components in the computer system and adding PRI nodes corresponding to the detected hardware components to the PRI. In one or more embodiments of the invention, for each hardware component, the firmware identifies the type of properties identified by the type of PRI node corresponding to the hardware component. The firmware may obtain the properties from the hardware component and populate the PRI node.

In step 203, the operating system and fault manager are loaded. Specifically, the operating system with the fault manager is loaded into memory. In step 205, the PRI is translated into a topology. Specifically, the fault manager obtains the PRI from the firmware and translates the PRI into a topology. Translating the PRI into a topology is discussed below and in FIGS. 3A-3C.

In step 207, the computer system is monitored. Specifically, after creating the topology, the fault manager may monitor the hardware components of the computer system to ensure that the computer system continues to function properly (or within normal operating parameters). Monitoring the computer system is discussed below and in FIG. 4.

FIGS. 3A-3C show flowcharts for translating the PRI into a topology in accordance with one or more embodiments of the invention. FIG. 3A provides an overview of the translation in accordance with one or more embodiments of the invention.

In step 211, the PRI is obtained. In one or more embodiments of the invention, the fault manager reads the physical resource inventory from a pre-defined location of memory.

In step 213, the root PRI node is identified from the PRI. In one or more embodiments of the invention, the root PRI node is labeled as a root node. For example, the root PRI node may be a PRI node with the name "components". By finding the PRI node with the name "components", the root PRI node is identified. In one or more embodiments of the invention, the root PRI node is used to create a root topology node. The root topology node provides a basis from which to create the child topology nodes.

In step 215, the child PRI node(s) of the root PRI nodes are identified from the PRI. In one or more embodiments of the invention, the child PRI nodes are identified by following the reference in the current PRI node to the child PRI node. In one or more embodiments of the invention, the child PRI nodes of the root PRI node may be, for example, a "blade node" or a "chassis node". In one or more embodiments of the invention, the child PRI nodes are added to a list that associates child PRI nodes with the parent topology node corresponding to the parent PRI node of the child PRI nodes.

In step 217, the non-PCI express fabric nodes in the PRI are traversed starting with the child PRI nodes. Specifically, a topology node is created from each PRI node that is not a PCI express fabric node. In one or more embodiments of the invention, the traversal is depth-first. In such embodiments, after creating a topology node for the current PRI node, a topology node is created for a child node of the current PRI node. If the current PRI node does not have any child nodes that do not have corresponding topology nodes, then the traversal proceeds to the parent PRI node of the current PRI node. A determination is made whether the parent PRI node has any child PRI nodes that do not have corresponding topology nodes. If the parent PRI nodes have a child PRI node that does not have a corresponding topology node, then the traversal proceeds to the child PRI node. Otherwise, the traversal proceeds to the parent of the current PRI node.

In one or more embodiments of the invention, the PRI nodes are traversed as discussed above until a PCI express fabric node (i.e., a PRI node corresponding to a PCI express hardware component) is encountered. Namely, the traversal of the PRI nodes stops and backtracks when a PCI express fabric node is encountered. In one or more embodiments of the invention, the first PCI express fabric node encountered is a root complex of the I/O subsystem, such as an I/O controller. When a PCI-express fabric node is identified in step 217, a topology node is created from the PCI express fabric node. However, rather than traversing the PCI express fabric by traversing to the child PRI nodes of the PCI express fabric node, the child nodes of the PCI express fabric nodes are ignored.

In step 219, the PCI express fabric nodes are constructed using an operating system device store. Because the PCI express fabric may span multiple hardware components that are field replaceable units before exiting the computer system, the traversal of the PCI express fabric is deferred to ensure that every field replaceable unit is in the topology.

In one or more embodiments of the invention, the construction starts with a PCI express fabric node represented in the topology. Using the operating system device store, the remaining nodes of the PCI express fabric are constructed. During the construction of the PCI express fabric topology using the operating system device store, if a device in the operating system store has the chassis location name property set, then the topology node having the corresponding location string is located. The field replaceable unit information from the existing topology node is added to the fabric topology node being created.

FIG. 3B shows a flowchart for traversing the PRI nodes in accordance with one or more embodiments of the invention. Specifically, FIG. 3B shows a flowchart for traversing the non-PCI express fabric nodes and the PCI express fabric nodes.

In step 231, the parent topology node is identified for the current PRI node. In one or more embodiments of the invention, each child topology node may have multiple parents. As discussed above, the parent topology node(s) may be in a list that associates the parent topology node(s) with its child PRI nodes. By identifying the child PRI node in the list, the parent topology nodes of the child PRI nodes may be identified.

In step 233, properties of the current PRI node are identified. Specifically, data in the current PRI node is accessed. From the properties, in step 235, a determination is made about whether the skip node property in the current PRI node is set. The skip property is set to indicate the PRI node should not have a corresponding topology node in the topology. Namely, the skip property allows the firmware to have a PRI node that may be used by the firmware or other software without having the PRI node in the topology. In such a scenario, child PRI nodes of the current PRI node are also skipped. If the skip property is set in the current PRI node, the enumerator traverses to the next PRI node in the topology in step 245. Because the child topology nodes are also skipped when the current topology node is skipped, traversing to the next PRI node includes traversing to a parent PRI node of the current PRI node.

If the skip node property is not set, then in step 237 a determination is made about whether the required properties in the current PRI node are set. If the required properties in the current PRI node are not set, the current PRI node is skipped in accordance with one or more embodiments of the invention. Specifically, in such a scenario, the enumerator may not have enough information to create the topology node in accordance with one or more embodiments of the invention. In such a scenario, child PRI nodes of the current PRI node are also skipped. If the required properties are not set in the current PRI node, the enumerator traverses to the next PRI node in the topology in step 245. Because the child topology nodes are also skipped when the current topology node is skipped, traversing to the next PRI node includes traversing to a parent PRI node of the current PRI node.

If the required properties are set, then a topology node is created from the current PRI node in step 239. Specifically, a new topology node is created and added as a child of the parent topology node. Creating the child topology node is discussed below and in FIG. 3C. In step 241, a determination is made whether the creation of the topology node is successful. If the creation of the topology node is not successful, then the enumerator traverses to the parent PRI node of the current PRI node in step 245.

In step 243, if the creation of the topology node is successful, then topology node ranges are created for the children nodes of the current PRI node. Specifically, the child PRI nodes of the current PRI node are identified using the reference in the current PRI node. For each child PRI node of the current PRI node, the identifier of the topology node corresponding to the current PRI node is added to the list that associates the parent topology node with the child PRI node.

In step 245, the method traverses to the next PRI node. As discussed above, the traversal is depth-first. Accordingly, the next PRI node is the child of the current PRI node if an unvisited child exists. FIG. 3B is repeated for the next PRI node.

FIG. 3C shows a flowchart for creating a topology node from a PRI node in accordance with one or more embodiments of the invention. Specifically, a new topology node is created and added as a child of the parent topology node. In step 251, the type property of the PRI node is identified. In step 253, a determination is made about whether a creation routine corresponding to the type property exists. In particular, some types of hardware components have corresponding creation routines.

If a creation routine corresponding to the type property exists, then the creation routine is initiated based on the type property in step 255. In such a scenario, the topology node is created using the creation routine specific to the type property. For example, if the type property indicates that the topology node is a PCI express fabric node, then the creation routine creates a generic node as discussed below (in steps 259-267) and adds additional information. Specifically, the additional information may include a "dev" property. The "dev" property has a format of "/pci@xxx" in which "xxx" is the hex value of the "cfg-handle" property (i.e., the property that uniquely identifies a device). Other types of hardware components may also have corresponding creation routines that are specific to the type of hardware component.

Continuing with FIG. 3C, in step 257, a generic creation routine is initiated based on the canonical name. The generic creation routine may be used for PRI nodes that do not have a specific creation routine. In the generic creation routing, in step 259, a determination is made whether the PRI node corresponds to a FRU. If the PRI node is a FRU, then the properties for replacing the field replaceable unit is copied into the topology node in step 261. For example, the copied properties may include serial number, dash number, part number, and revision number. In one or more embodiments of the invention, the serial number and dash number properties are concatenated without a separator when creating the topology node.

Regardless of whether the PRI node corresponds to a FRU, in step 263, a location string property in the PRI node is identified. If the PRI node corresponds to a FRU, then the location string property is in the PRI node. Alternatively, if the PRI node does not correspond to a FRU, then the location string property of the parent topology node is used. Namely, the location string property of the PRI node that is not a FRU is the location string property of the closest parent of the PRI node that is a FRU. In step 265, the label of the topology node is set as the location string property of the PRI node in accordance with one or more embodiments of the invention.

In step 267, properties of the PRI node are added to the topology node. Specifically, remaining properties in the PRI node may be added to the topology node. In one or more embodiments of the invention, the remaining properties are reformatted as specified by the generic creation routine. After adding the remaining properties, the enumerator may traverse to the next PRI node as discussed above until the topology is completed. Accordingly, after the PRI is non-PCI express fabric nodes and PCI express fabric nodes are added to the topology, the fault manager has a topology of the hardware components of the computer system.

FIG. 4 shows a flowchart for monitoring the computer system in accordance with one or more embodiments of the invention. Specifically, FIG. 4 shows a flowchart for monitoring the computer system using the topology and the generic error reports in accordance with one or more embodiments of the invention. In step 281, an error is detected. Specifically, a detector may identify the presence of an error. The detector sends the information to the firmware.

In step 283, firmware constructs an error report from the error. In one or more embodiments of the invention, the firmware constructs the error report in a generic manner as discussed above. Namely, the error report is constructed with name-value pairs, and the error report explicitly identifies the hardware components involved. After constructing the error report, the firmware may interrupt the fault manager with the error report.

In step 285, the error report is received by the diagnosis engine. In step 287, the error report is processed. Specifically, the diagnosis engine may first check the valid field in the error report to determine whether to process the error report. If the valid field indicates that the diagnosis engine should process the error report, then the diagnosis engine processes the error report.

In general, when processing the error report, the diagnosis engine obtains necessary data from the error report based on the name-value pairs. Processing the error report may involve identifying the error class from the error report. In one or more embodiments of the invention, the error class is defined in the name of the error report. After identifying the error class, the diagnosis engine may access generic rules associated with the error class. Based on the generic rules, the diagnosis engine accesses information in the error report to determine whether the information matches a rule for detecting a fault.

Because a set number of error classes exist, the error report is defined in a platform independent format, and the diagnosis engine has information about the format, the information accessed by the diagnosis engine does not require the diagnosis engine to have predefined platform specific information. Specifically, the format of the error report is uniform amongst multiple different platforms and does not require platform specific knowledge for the diagnosis engine to diagnose the fault in accordance with one or more embodiments of the invention.

For example, consider the scenario in which an error is detected in the data cache. In one computer system, the data cache is assigned to a strand. In another computer system, the data cache is assigned to a core. However, because the error report includes a fault management resource identifier that identifies the location of the data cache with respect to the chip, strand, and core, the diagnosis engine may process the error report in the same manner regardless of whether the error is detected on the first computer system or the second computer system. Namely, the diagnosis engine does not need to be changed to match the first computer system or the second computer system in accordance with one or more embodiments of the invention. As shown by way of the example, all information to process the error report is in the error report without requiring prior knowledge of the computer system.

When processing the error report, the diagnosis engine may create a fault report. In one or more embodiments of the invention, the format of the report is independent of the hardware components. Specifically, the fault report may be named with a generic name and use the fault management resource identifier to identify the faulty hardware component. The format of the fault management resource identifier is discussed above.

In step 289, the fault is addressed based on a fault report using the topology by the response agent. For example, the response agent may power down the faulty hardware component, notify a user to replace the faulty hardware component, mitigate the fault (e.g., isolate the faulty hardware component) or perform other actions for addressing the fault.

The following is an example of an error report and a corresponding fault report. The following is for exemplary purposes only and is not intended to limit the scope of the invention. For the example, consider the scenario in which firmware of a computer system issues the following error report in the generic sparc cache error class (i.e., ereport.cpu-.generic-sparc.l3tagctl-uc):

1. nvlist version: 0
2.    detector = (embedded nvlist)

-continued

```
 3.     nvlist version: 0
 4.         version = 0x0
 5.         scheme = hc
 6.         hc-list = (array of embedded nvlists)
 7.         (start hc-list[0])
 8.             nvlist version: 0
 9.                 scheme =
10.                 hc-name = chassis
11.                 hc-id = 0
12.         (end hc-list[0])
13.         (start hc-list[1])
14.             nvlist version: 0
15.                 scheme =
16.                 hc-name = motherboard
17.                 hc-id = 0
18.         (end hc-list[1])
19.         (start hc-list[2])
20.             nvlist version: 0
21.                 scheme =
22.                 hc-name = cpuboard
23.                 hc-id = 0
24.         (end hc-list[2])
25.         (start hc-list[3])
26.             nvlist version: 0
27.                 scheme =
28.                 hc-name = chip
29.                 hc-id = 0
30.         (end hc-list[3])
31.         (start hc-list[4])
32.             nvlist version: 0
33.                 scheme =
34.                 hc-name = core
35.                 hc-id = 0
36.         (end hc-list[4])
37.     (end detector)
38.     tstate = 0x9982001a07
39.     htstate = 0x0
40.     tpc = 0xff381080
41.     tl = 0x1
42.     tt = 0x32
43.     valid = 1
44.     platform-specific = (embedded nvlist)
45.         nvlist version: 0
46.             scheme =
47.             i-sfsr = 0x0
48.             d-sfsr = 0x3
49.             d-sfar = 0x30005eb600
50.             tlb-ways = 0x2
51.     (end platform-specific)
52.     class = ereport.cpu.generic-sparc.l3tagctl-uc
53.     ena = 0x7321860000000001
54.     __ttl = 0x1
55.     __tod = 0x492711b3 0x2d7671ba
```

As shown in the example, the error report provides information to the diagnosis engine about the type of error. Specifically, line 1 of the error report identifies the version of the nvlist. Lines 2-37 provide information about the detector that issued the error. Specifically, as shown in lines 2-37, the error was detected by a particular detector on a particular core. The hc-id in lines 11, 17, 23, 29, and 35 provides an identifier of the chassis, motherboard, cpuboard, chip, and core, respectively. Thus, for example, if the detector occurred on a different core of the same chip, the hc-id in line 35 may be a different number besides "0" that identifies the different core. In lines 38-42, the error report provides specific information about the error, such as trap level, trap type, trap state, hypervisor trap state, trap program counter, and other such information. In line 43, the error report indicates that the diagnosis engine should process the error. Lines 44-51 provide platform specific information about the error for use, for example, by an administrator.

After receiving the error report, the diagnosis engine processes the error report. The processing of the error report may result in the following fault report:

```
 1. nvlist version: 0
 2.     version = 0x0
 3.     class = list.suspect
 4.     uuid = 1d63ec4f-14ae-4380-e14c-fa67d8772e04
 5.     code = SUN4V-8002-CA
 6.     diag-time = 1227297204 776608
 7.     de = (embedded nvlist)
 8.     nvlist version: 0
 9.         version = 0x0
10.         scheme = fmd
11.         authority = (embedded nvlist)
12.         nvlist version: 0
13.             version = 0x0
14.             product-id = SUNW,SPARC-Enterprise-T5120
15.             server-id = san-hur1u-0
16.         (end authority)
17.         mod-name = eft
18.         mod-version = 1.16
19.     (end de)
20.     fault-list-sz = 0x1
21.     fault-list = (array of embedded nvlists)
22.     (start fault-list[0])
23.     nvlist version: 0
24.         version = 0x0
25.         class = fault.cpu.generic-sparc.core-uc
26.         certainty = 0x64
27.         resource = (embedded nvlist)
28.         nvlist version: 0
29.             version = 0x0
30.             scheme = hc
31.             hc-root =
32.             authority = (embedded nvlist)
33.             nvlist version: 0
34.                 product-id = SUNW,SPARC-Enterprise-T5120
35.                 server-id = san-hur1u-0
36.             (end authority)
37.             hc-list-sz = 0x5
38.             hc-list = (array of embedded nvlists)
39.             (start hc-list[0])
40.             nvlist version: 0
41.                 hc-name = chassis
42.                 hc-id = 0
43.             (end hc-list[0])
44.             (start hc-list[1])
45.             nvlist version: 0
46.                 hc-name = motherboard
47.                 hc-id = 0
48.             (end hc-list[1])
49.             (start hc-list[2])
50.             nvlist version: 0
51.                 hc-name = cpuboard
52.                 hc-id = 0
53.             (end hc-list[2])
54.             (start hc-list[3])
55.             nvlist version: 0
56.                 hc-name = chip
57.                 hc-id = 0
58.             (end hc-list[3])
59.             (start hc-list[4])
60.             nvlist version: 0
61.                 hc-name = core
62.                 hc-id = 0
63.             (end hc-list[4])
64.         (end resource)
65.         fru = (embedded nvlist)
66.         nvlist version: 0
67.             version = 0x0
68.             scheme = hc
69.             hc-root =
70.             serial = C0
71.             part = 511-1161-01 REV 0100
72.             revision = 00
73.             hc-list-sz = 0x3
74.             hc-list = (array of embedded nvlists)
75.             (start hc-list[0])
76.             nvlist version: 0
77.                 hc-name = chassis
78.                 hc-id = 0
79.             (end hc-list[0])
80.             (start hc-list[1])
```

-continued

```
81.        nvlist version: 0
82.            hc-name = motherboard
83.            hc-id = 0
84.        (end hc-list[1])
85.        (start hc-list[2])
86.        nvlist version: 0
87.            hc-name = cpuboard
88.            hc-id = 0
89.        (end hc-list[2])
90.     (end fru)
91.     location = MB/CPU0
92.  (end fault-list[0])
93.  fault-status = 0x1
94.  __ttl = 0x1
95.  __tod = 0x492711b4 0x3018aee0
```

In the example fault report above, line 2 provides information about the version of nvlist. Line 3 provides the class, such as list, fault, and error report. Line 3 indicates that the object is a list object of type suspect. Namely, the object provides a container for one or more faults. The uuid in line 4 provides a unique identifier for the fault report. The code in line 5 provides an identifier for a user to learn more information about the fault. In the example, a user may use the identifier to look up information about the fault. In one or more embodiments of the invention, a fault management web page provides an interface for a user to enter the identifier and view the information. Line 6 provides the diagnosis time of the fault. Lines 7-19 provide information about the diagnosis engine. In one or more embodiments of the invention, the operating system maintains the information about the diagnosis engine. Lines 20-22 indicate the start of a list of faults that includes only a single fault. Lines 23-64 provide information about the location of the error. In the example, lines 23-64 are obtained from the error report because the location of the error is the same as the location of the detector that detected the error. Lines 65-90 provide information about the field replaceable unit having the error. The information may be found using the topology. Specifically, the topology indicates that the chip and core having the error are not field replaceable units. However, the cpu board having both the chip and the core is a field replaceable unit. Further, lines 70-72 provide information for replacing the cpu board, such as the serial number, the part number and the revision number. Thus, in the example, a user viewing the error report may replace or fix the cpu board.

As shown by way of example, the error report in conjunction with the topology provides the information necessary to diagnose the problem without the fault manager requiring additional information about the architecture of the computer system in accordance with one or more embodiments of the invention. Specifically, in one or more embodiments of the invention, because the topology provides the necessary information about the architecture and the error report is generic to all architectures, the same software code may be use to diagnose faulty components on a computer system.

Figure 5:
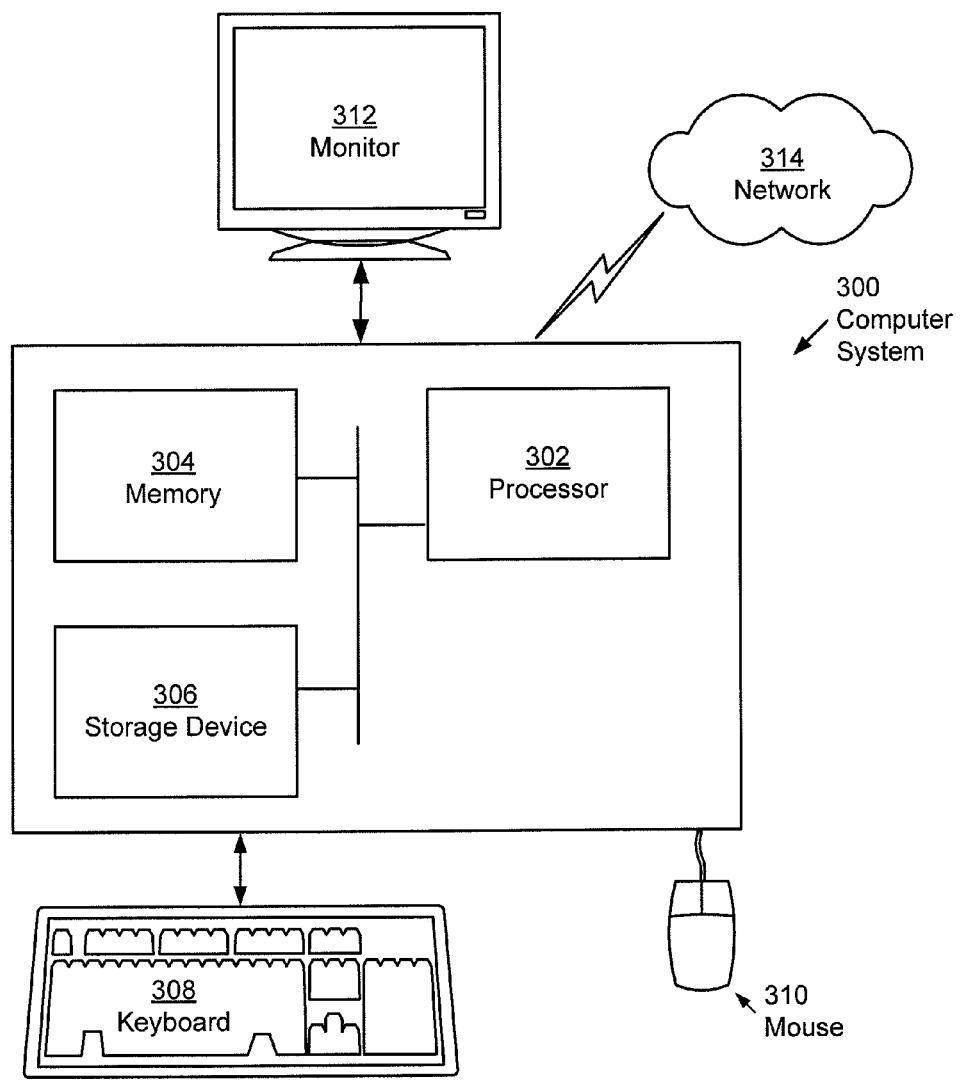
FIG. 5 shows a computer system in accordance with one or more embodiments of the invention.

Embodiments of the invention may be implemented on virtually any type of computer regardless of the platform being used. For example, as shown in FIG. 5, a computer system (300) includes one or more processor(s) (302), associated memory (304) (e.g., random access memory (RAM), cache memory, flash memory, etc.), a storage device (306) (e.g., a hard disk, an optical drive such as a compact disk drive or digital video disk (DVD) drive, a flash memory stick, etc.), and numerous other elements and functionalities typical of today's computers (not shown). The computer (300) may also include input means, such as a keyboard (308), a mouse (310), or a microphone (not shown). Further, the computer (300) may include output means, such as a monitor (312) (e.g., a liquid crystal display (LCD), a plasma display, or cathode ray tube (CRT) monitor). The computer system (300) may be connected to a network (314) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. For example, the computer system (300) may be a server system having multiple blades. Generally speaking, the computer system (300) includes at least the minimal processing, input, and/or output means necessary to practice embodiments of the invention. Further, software instructions to perform embodiments of the invention may be stored on a computer readable medium such as a compact disc (CD), a diskette, a tape, or any other computer readable storage device.

Embodiments of the invention provide a platform independent mechanism for performing fault management on a computer system. Specifically, in one or more embodiments of the invention, the hardware components may change between computer systems without adjusting the fault management components of the fault manager (e.g., enumerator, diagnosis engine, etc.). In embodiments in which the fault manager is part of the operating system, existing computer system or new computer system may use the fault management provided by the fault manager of the operating system without modification to the operating system. Thus, the deployment of a new computer system is decoupled from the deployment of an operating system providing fault management to the new computer system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for fault management, comprising:
generating, in firmware of a computer system, a physical resource inventory (PRI) of a plurality of hardware components of the computer system, wherein the PRI comprises a plurality of PRI nodes arranged in a hierarchy, wherein each PRI node of the plurality of PRI nodes corresponds to a hardware component of the plurality of hardware components; and
generating, by an enumerator executing in a fault manager, topology of the plurality of hardware components by:
performing a depth-first traversal of the PRI, wherein for each non-PCI express fabric PRI node of the plurality of PRI nodes processed in the depth-first traversal:
determining whether a skip property for the non-PCI express fabric PRI node is set; and
creating a non-PCI express fabric topology node in the topology for the non-PCI express fabric PRI node only when the skip property for the non-PCI express fabric PRI node is not set; and
constructing, in the topology after performing the depth-first traversal, a PCI express fabric topology node for each PCI express fabric PRI node of the plurality of PRI nodes,
wherein child PRI nodes of each PCI express fabric PRI node are skipped during the depth-first traversal, and
wherein the topology is used for fault management of the computer system.

2. The method of claim 1, wherein the PRI comprises an identifier property, wherein the identifier property is unique among the plurality of PRI nodes corresponding to a same type of hardware component.

3. The method of claim 1, wherein a PRI node of the plurality of PRI nodes comprises a serial number, a part number, a revision number, and a dash number when the PRI node corresponds to a hardware component of the plurality of hardware components that is a field replaceable unit.

4. The method of claim 3, wherein the PRI node further comprises a location string property.

5. A computer system, comprising:
   a plurality of hardware components;
   firmware configured to:
      generate a physical resource inventory (PRI) of the plurality of hardware components in the computer system, wherein the PRI comprises a plurality of PRI nodes arranged in a hierarchy, wherein each PRI node of the plurality of PRI nodes of the hardware components; and
   an enumerator executing on a operating system and configured to:
      generate a topology of the plurality of hardware components by:
         performing a depth-first traversal of the PRI, wherein for each non-PCI express fabric PRI node of the plurality of PRI nodes processed in the depth-first traversal:
            determining whether a skip property for the non-PCI express fabric PRI node is set; and
            creating a topology node in the topology for the non-PCI express fabric PRI node only when the skip property for the non-PCI express fabric PRI node is not set; and
         constructing, in the topology after performing the depth-first traversal, a PCI express fabric topology node for each PCI express fabric PRI node of the plurality of PRI nodes,
         wherein child PRI nodes of each PCI express fabric PRI node are skipped during the depth-first traversal, and
      wherein the topology is used for fault management of the computer system.

6. The computer system of claim 5, wherein the PRI comprises an identifier property, wherein the identifier property is unique among the plurality of PRI nodes corresponding to a same type of hardware component.

7. The computer system of claim 5, wherein a PRI node of the plurality of in the PRI comprises a serial number, a part number, a revision number, and a dash number when the PRI node corresponds to a hardware component of the plurality of hardware components that is a field replaceable unit.

8. The computer system of claim 7, wherein the PRI node further comprises a location string property.

9. The computer system of claim 5, wherein the firmware is further configured to:
   detect an error; and
   generate an error report,
   wherein the error report identifies an error class of the error, and
   wherein the error report conforms to an error class specification that is generic to a plurality of computer systems.

10. The computer system of claim 9, wherein the error class is an error class for a correctable error, and wherein the error class specification comprises a threshold value and a duration of time value, wherein the threshold value identifies allowed correctable errors during a duration of time specified by the duration of time value and, wherein the number value and the duration of time value are provided by the firmware to override default values in a diagnosis engine.

11. The method of claim 1, wherein creating the non-PCI express fabric topology node comprises:
   identifying a type property in the non-PCI express fabric PRI node, wherein the type property specifies a type of hardware component corresponding to the non-PCI express fabric PRI node; and
   initiating a creation routine specific to the type property.

12. The method of claim 1, wherein creating the non-PCI express fabric topology node comprises:
   identifying a type property in the non-PCI express fabric PRI node, wherein the type property specifies a type of hardware component corresponding to the non-PCI express fabric PRI node;
   making a determination that a creation routine specific to the type property does not exist; and
   initiating a generic creation routine based on the determination.

13. The computer system of claim 5, wherein creating the non-PCI express fabric topology node comprises:
   identifying a type property in the non-PCI express fabric PRI node, wherein the type property specifies a type of hardware component corresponding to non-PCI express fabric PRI node; and
   initiating a creation routine specific to the type property.

14. The computer system of claim 5, wherein creating the non-PCI express fabric topology node comprises:
   identifying a type property in the non-PCI express fabric PRI node, wherein the type property specifies a type of hardware component corresponding to non-PCI express fabric PRI node;
   making a determination that a creation routine specific to the type property does not exist; and
   initiating a generic creation routine based on the determination.

* * * * *